US011209984B2

(12) United States Patent
Yang et al.

(10) Patent No.: US 11,209,984 B2
(45) Date of Patent: Dec. 28, 2021

(54) METHOD AND APPARATUS FOR PERFORMING DATA-COMPRESSION MANAGEMENT IN A STORAGE SERVER

(71) Applicant: Silicon Motion Inc., Hsinchu County (TW)

(72) Inventors: Tsung-Chieh Yang, Hsinchu (TW); Wen-Long Wang, Hsinchu (TW)

(73) Assignee: Silicon Motion, Inc., Hsinchu County (TW)

( * ) Notice: Subject to any disclaimer, the term of this patent is extended or adjusted under 35 U.S.C. 154(b) by 23 days.

(21) Appl. No.: 16/278,182

(22) Filed: Feb. 18, 2019

(65) Prior Publication Data

US 2020/0264778 A1    Aug. 20, 2020

(51) Int. Cl.
  *G06F 3/06*    (2006.01)
(52) U.S. Cl.
  CPC ............ *G06F 3/0608* (2013.01); *G06F 3/064* (2013.01); *G06F 3/0673* (2013.01)
(58) Field of Classification Search
  CPC .... G06F 3/0608; G06F 3/0673; G06F 3/0683; G06F 3/0689; G06F 3/0641
  See application file for complete search history.

(56) References Cited

U.S. PATENT DOCUMENTS

| | | | |
|---|---|---|---|
| 9,521,218 B1 | 12/2016 | Fan | |
| 10,452,616 B1 * | 10/2019 | Bassov | G06F 3/067 |
| 2008/0025298 A1 * | 1/2008 | Lev-Ran | H04L 69/04 |
| | | | 370/389 |
| 2012/0020408 A1 * | 1/2012 | Chen | H04N 19/134 |
| | | | 375/240.03 |
| 2014/0195499 A1 | 7/2014 | Amit | |
| 2018/0367161 A1 * | 12/2018 | Ki | G06F 3/064 |

FOREIGN PATENT DOCUMENTS

CN        103004195 A        3/2013

OTHER PUBLICATIONS

Jason, Public Document "Measurement of Information—Information Entropy" https://blog.xuite.net/metafun/life/69851478-%E8%B3%87%E8%A8%8A%E7%9A%84%E5%BA%A6%E9%87%8F-+Information+Entropy, p. 1-7, May 28, 2013.

* cited by examiner

*Primary Examiner* — David Yi
*Assistant Examiner* — Dustin B. Fulford
(74) *Attorney, Agent, or Firm* — Winston Hsu (57) ABSTRACT

A method for performing data-compression management in a storage server may include: receiving data from a host device; performing entropy detection on a plurality of sets of partial data to generate entropy detection values of the plurality of sets of partial data, respectively; classifying the plurality of sets of partial data according to the entropy detection values of the plurality of sets of partial data, respectively, to perform data compression on at least one portion of the plurality of sets of partial data through a plurality of data compression modules, respectively, wherein the plurality of data compression modules correspond to different compression capabilities, respectively; and storing the plurality of sets of partial data into at least one storage device of the storage server and recording address mapping information of the plurality of sets of partial data, respectively. An associated apparatus is also provided.

21 Claims, 9 Drawing Sheets

METHOD AND APPARATUS FOR PERFORMING DATA-COMPRESSION MANAGEMENT IN A STORAGE SERVER

BACKGROUND OF THE INVENTION

1. Field of the Invention

The present invention is related to data storage, and more particularly, to a method and apparatus for performing data-compression management in a storage server.

2. Description of the Prior Art

Data compression may be helpful on saving storage space of a storage server. While the storage space is saved through data compression, some problems may occur, however. As user data may vary, certain types of data may be received to be stored in the storage server, and performing data compression on these types of data may be time consuming, causing the overall performance of the storage server to be degraded. Thus, a novel method and associated architecture are needed for solving the problems without introducing any side effect or in a way that is less likely to introduce a side effect.

SUMMARY OF THE INVENTION

It is therefore an objective of the present invention to provide a method and apparatus for performing data-compression management in a storage server, in order to solve the above-mentioned problems.

It is another objective of the present invention to provide a method and apparatus for performing data-compression management in a storage server, in order to achieve an optimal performance without introducing a side effect or in a way that less likely to introduce a side effect.

At least one embodiment of the present invention provides a method for performing data-compression management in a storage server, wherein the method is applied to the storage server. The method may comprise: receiving data from a host device, wherein the data comprises a plurality of sets of partial data; performing entropy detection on the plurality of sets of partial data to generate entropy detection values of the plurality of sets of partial data, respectively, wherein an entropy detection value of any set of partial data within the plurality of sets of partial data is related to an average number of bits required for expressing a data unit of multiple data units within said any set of partial data; classifying the plurality of sets of partial data according to the entropy detection values of the plurality of sets of partial data, respectively, to perform data compression on at least one portion of the plurality of sets of partial data through a plurality of data compression modules, respectively, wherein the plurality of data compression modules correspond to different compression capabilities, respectively; and storing the plurality of sets of partial data into at least one storage device of the storage server and recording address mapping information of the plurality of sets of partial data, respectively, wherein said at least one portion of the plurality of sets of partial data is stored as compressed data thereof to save storage space of the storage server.

At least one embodiment of the present invention provides an apparatus for performing data-compression management in a storage server, wherein the apparatus may comprise a control circuit that is positioned within the storage server and arranged to control operations of the storage server, and the control circuit may comprise an entropy-based classification circuit. More particularly, the control circuit controls the storage server to receive data from a host device, wherein the data comprises a plurality of sets of partial data. In addition, the entropy-based classification circuit may be arranged to perform entropy-based classification. For example, the entropy-based classification circuit may perform entropy detection on the plurality of sets of partial data to generate entropy detection values of the plurality of sets of partial data, respectively, wherein an entropy detection value of any set of partial data within the plurality of sets of partial data is related to an average number of bits required for expressing a data unit of multiple data units within said any set of partial data. The entropy-based classification circuit may classify the plurality of sets of partial data according to the entropy detection values of the plurality of sets of partial data, respectively, to perform data compression on at least one portion of the plurality of sets of partial data through a plurality of data compression modules, respectively, wherein the plurality of data compression modules correspond to different compression capabilities, respectively. Additionally, the control circuit may be arranged to store the plurality of sets of partial data into at least one storage device of the storage server and record address mapping information of the plurality of sets of partial data, respectively, wherein said at least one portion of the plurality of sets of partial data is stored as compressed data thereof to save storage space of the storage server.

The present invention method and associated apparatus can guarantee that the storage server operates properly in various situations. For example, the method provides multiple control schemes for storage control, to enhance the performance of the storage server, where the overall compression speed can be greatly increased and preparation (e.g. hash comparison) for performing de-duplicate processing can be performed very fast. In comparison with the related art, the storage server implemented according to the present invention can have better performance.

These and other objectives of the present invention will no doubt become obvious to those of ordinary skill in the art after reading the following detailed description of the preferred embodiment that is illustrated in the various figures and drawings.

DETAILED DESCRIPTION

Embodiments of the present invention provide a method and apparatus for performing data-compression management in a storage server, and the apparatus may comprise at least one portion (e.g. a portion or all) of the storage server. For example, the apparatus may comprise a portion of the storage server, such as a control circuit positioned within the storage server (e.g. a processing circuit running one or more program modules corresponding to the method, and a storage interface circuit comprising one or more sub-circuits corresponding to the method). In another example, the apparatus may comprise the whole of the storage server.

Figure 1:
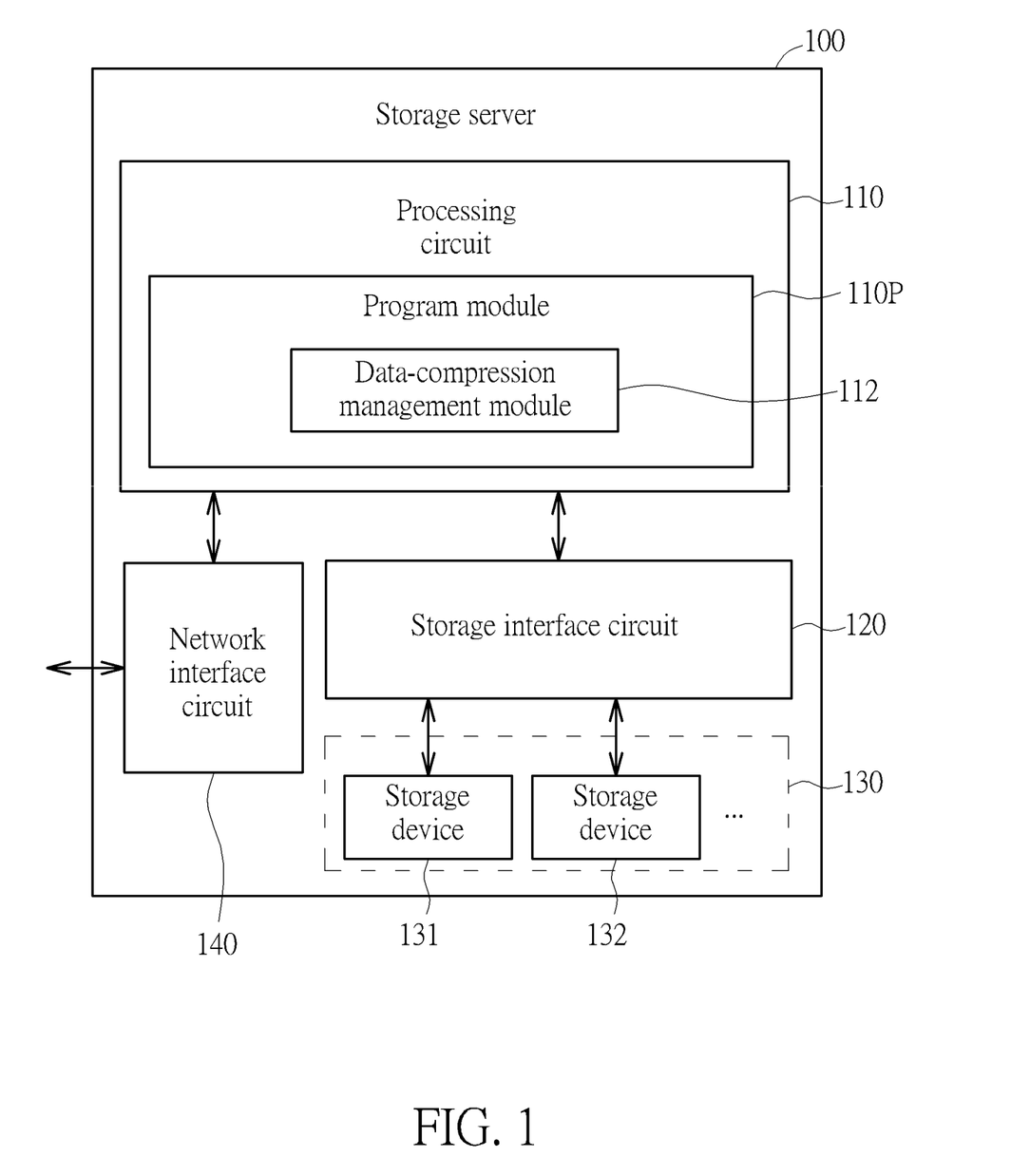
FIG. 1 is a diagram of a storage server according to an embodiment of the present invention.

FIG. 1 is a diagram of a storage server 100 according to an embodiment of the present invention. The storage server 100 may comprise a processing circuit 110 (e.g. at least one processor and associated circuits such as Random Access Memory (RAM), bus, etc.) for controlling operations of the storage server 100, a storage interface circuit 120 for coupling storage or memory devices (e.g. one or more Hard Disk Drive (HDDs) and/or one or more Solid State Drives (SSDs)) at the storage server 100, and a network interface circuit 140 for coupling the storage server 100 to at least one network. The storage or memory devices may comprise at least one storage device such as one or more storage devices, which may be collectively referred to as the storage device 130. For example, the storage device 130 may comprise a set of storage devices {131, 132, ...}, where one of them may be utilized as a system disk of the storage server 100, and the others may be arranged to store user data for the storage server 100, but the present invention is not limited thereto. According to this embodiment, the processing circuit 110 running program modules 110P (more particularly, a data-compression management module 112 corresponding to the method) may be arranged to control operations of the storage server 100 according to the method, and the storage interface circuit 120 may conform to one or more specifications (e.g. one or more of Serial Advanced Technology Attachment (Serial ATA, or SATA) specification, Peripheral Component Interconnect (PCI) specification, Peripheral Component Interconnect Express (PCIe) specification, Non-Volatile Memory Express (NVMe) specification, NVMe-over-Fabrics (NVMeoF) specification, Small Computer System Interface (SCSI) specification, etc.), and may perform communications according to the one or more specifications, to allow the processing circuit 110 running the program modules 110P to access the storage device 130 through the storage interface circuit 120. In addition, the network interface circuit 140 may be arranged to provide wired or wireless network connections, and one or more host devices corresponding to one or more users may access (e.g. read or write) user data in the storage server 100 through the wired or wireless network connections. For better comprehension, the storage server 100 and the associated circuits/modules/devices in the architecture shown in FIG. 1 (e.g. the processing circuit 110 running the program modules 110P, and the storage interface circuit 120) may be taken as examples of the aforementioned storage server and the associated circuits/modules/devices thereof (e.g. the processing circuit running the one or more program modules corresponding to the method, and the storage interface circuit comprising the one or more sub-circuits corresponding to the method), respectively.

According to some embodiments, the processing circuit 110 running the program modules 110P or the storage interface circuit 120 may configure at least one portion (e.g. a portion or all) of the set of storage devices {131, 132, ...} to form a Redundant Array of Independent Disks (RAID) of the storage server 100. For example, the aforementioned at least one portion of the set of storage devices {131, 132, ...} may be installed in the storage server 100 to form the RAID such as an All Flash Array (AFA).

Figure 2:
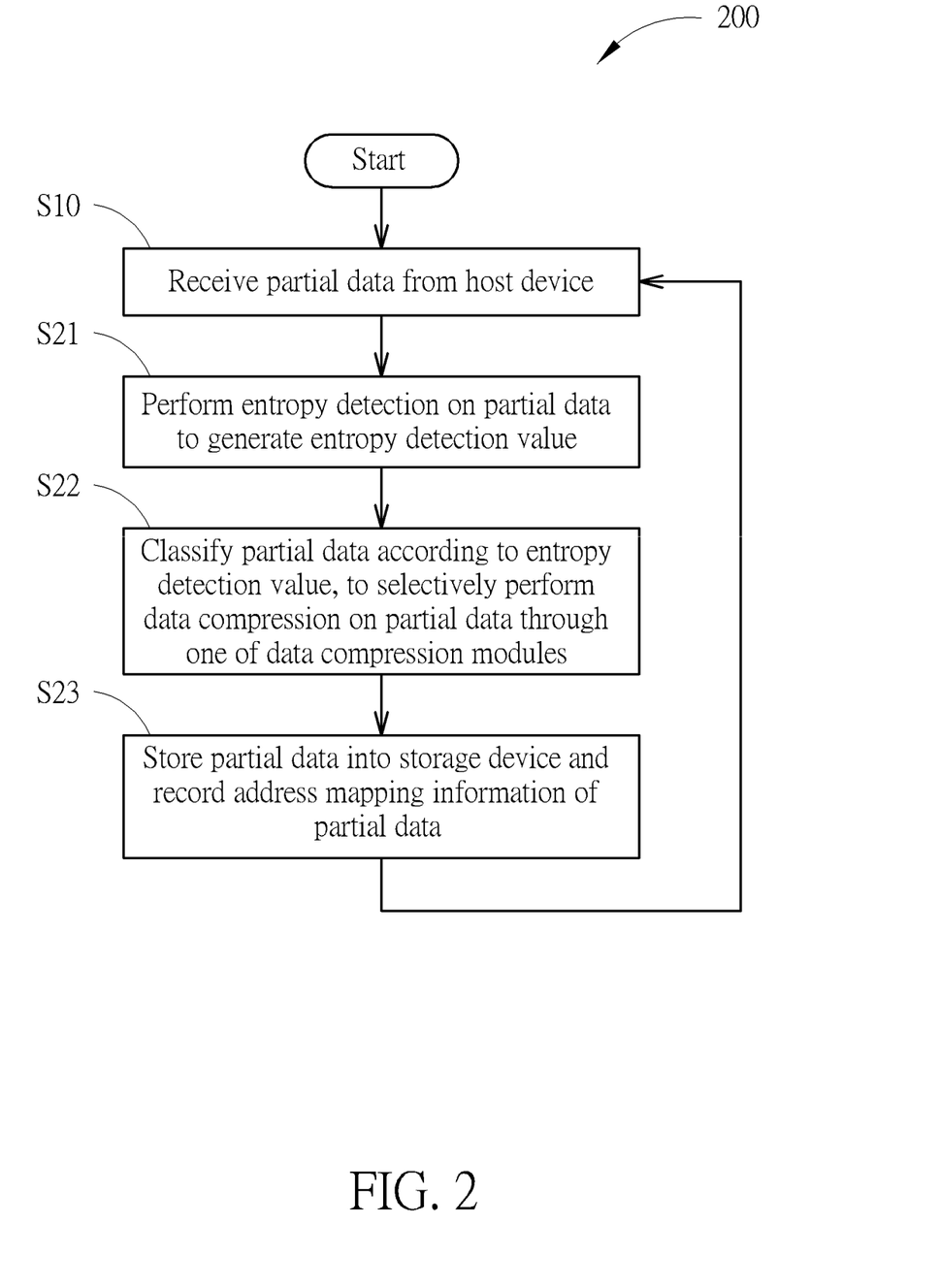
FIG. 2 is a working flow of a method for performing data-compression management in a storage server according to an embodiment of the present invention.

FIG. 2 is a working flow 200 of the method for performing data-compression management in the storage server according to an embodiment of the present invention. The method can be applied to the storage server 100 comprising the processing circuit 110 running the program modules 110P (e.g. the data-compression management module 112 corresponding to the method), where the control circuit such as the processing circuit 110 running the data-compression management module 112 may control the storage server 100 to operate according to the method.

In Step S10, the storage server 100 may receive partial data from a host device. For example, the host device may be linked to the storage server 100 through the wired or wireless network connections mentioned above. According to this embodiment, the control circuit (e.g. the processing circuit 110 running the data-compression management module 112) may control the storage server 100 to receive data from the host device, where the data may comprise a plurality of sets of partial data. The partial data mentioned in Step S10 may represent any set of partial data within the plurality of sets of partial data.

In Step S21, the storage server 100 may perform entropy detection on the partial data to generate an entropy detection value, such as the entropy detection value of the aforementioned any set of partial data within the plurality of sets of partial data. According to this embodiment, the control circuit (e.g. the processing circuit 110 running the data-compression management module 112) may perform entropy detection on the plurality of sets of partial data to generate entropy detection values of the plurality of sets of partial data, respectively, where the entropy detection value is one of the entropy detection values. The entropy detection value may be related to (e.g. in positive correlation with, and more particularly, proportional to) an average number of bits required for expressing a data unit of multiple data units within the aforementioned any set of partial data. For example, the entropy detection value may be an estimation value indicating a number of bits per data unit for storing a compressed version of this set of partial data.

For better comprehension, assume that the average number of bits required for expressing the data unit is equal to an estimated number such as e. In addition, a predetermined number of bits of each of the data units may be the number of bits of each byte (i.e. 8), which means the data units may be bytes, but the present invention is not limited thereto. The average number of bits required for expressing the data unit (e.g. e) may be less than or equal to the predetermined number of bits of each of the data units (e.g. 8). According to this embodiment, the entropy detection value of the aforementioned any set of partial data may include an integer part and a fractional part, and the number of digits forming the fractional part is within a predetermined digit count, such as a certain digital count N. According to some embodiments, the entropy detection value may be equal to the average number of bits required for expressing the data unit (e.g. e), and therefore may be referred to as the entropy detection value e. For example, in a situation where N=5, the entropy detection value e (e.g. e=4.48976) may have 5 digits in the fractional part thereof (e.g. "48976" of 4.48976).

In Step S22, the storage server 100 may classify the partial data according to the entropy detection value, to selectively perform data compression on the partial data through one of a plurality of data compression modules. According to this embodiment, the control circuit (e.g. the processing circuit 110 running the data-compression management module 112) may classify the plurality of sets of partial data according to the entropy detection values of the plurality of sets of partial data, respectively, to perform data compression on at least one portion (e.g. a portion or all) of the plurality of sets of partial data through the plurality of data compression modules, respectively, where the plurality of data compression modules correspond to different compression capabilities, respectively. For example, within the aforementioned at least one portion of the plurality of sets of partial data, two sets of partial data respectively corresponding to two different classification results may be compressed with two of the plurality of data compression modules, respectively.

In Step S23, the storage server 100 may store the partial data into the storage device 130 and record address mapping information of the partial data. According to this embodiment, the control circuit (e.g. the processing circuit 110 running the data-compression management module 112) may store the plurality of sets of partial data into at least one storage device of the storage server 100, such as the storage device 130, and record address mapping information of the plurality of sets of partial data, respectively, where the aforementioned at least one portion of the plurality of sets of partial data may be stored as compressed data thereof to save storage space of the storage server 100. For example, the address mapping information of the plurality of sets of partial data may indicate the locations where the plurality of sets of partial data are stored (e.g. re-mapped logical addresses of the plurality of sets of partial data within the storage device 130), respectively.

For better comprehension, the method may be illustrated with the working flow 200, but the present invention is not limited thereto. According to some embodiments, one or more steps may be added, deleted, or changed in the working flow 200.

Figure 3:
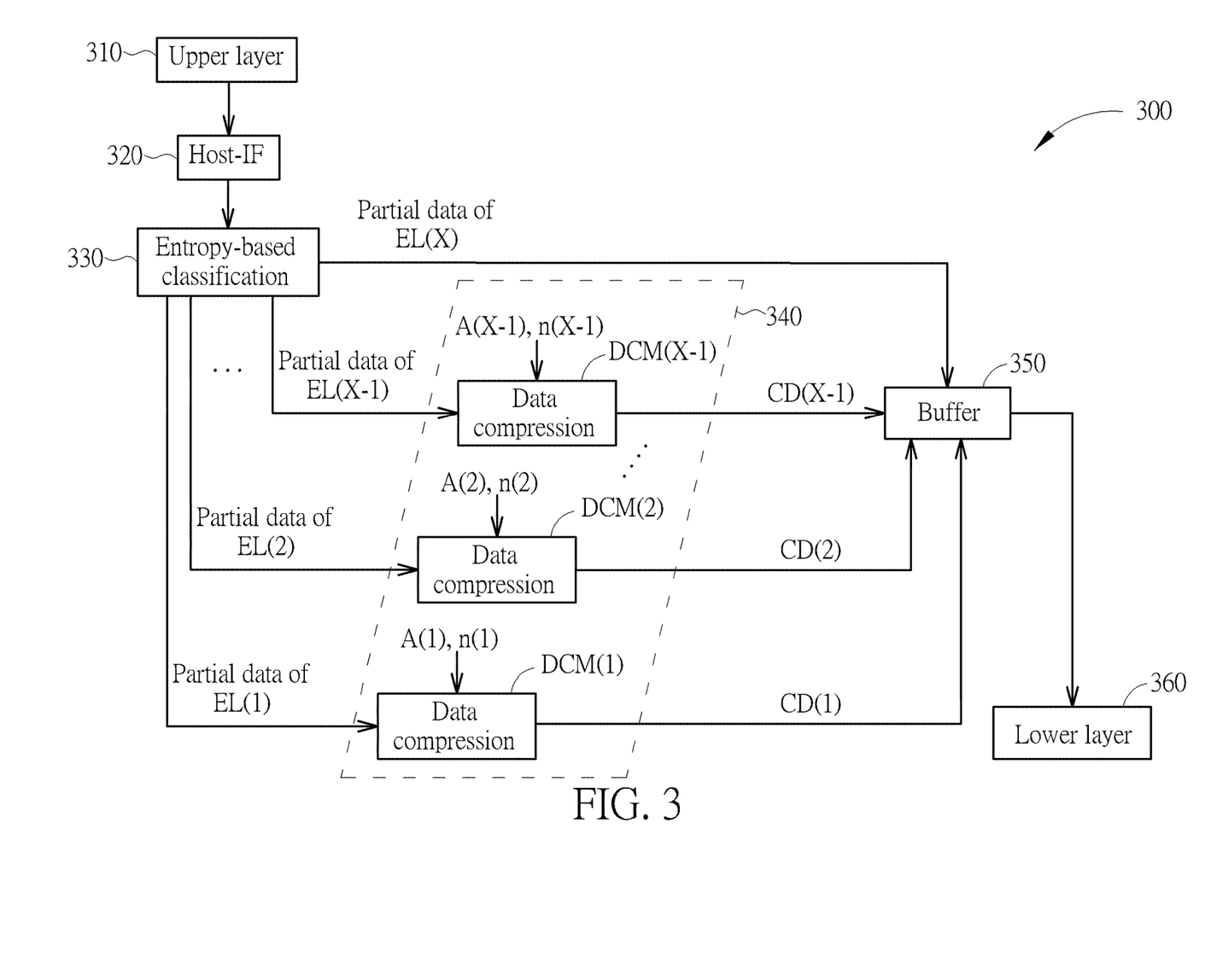
FIG. 3 illustrates a control scheme of the method according to an embodiment of the present invention.

FIG. 3 illustrates a control scheme of the method according to an embodiment of the present invention. The apparatus 300 may comprise an upper layer 310, and comprise sub-circuits of the control circuit, such as a host interface circuit 320 (labeled "Host-IF" in FIG. 3, for brevity), an entropy-based classification circuit 330 (labeled "Entropy-based classification" in FIG. 3, for brevity), and a plurality of data compression circuits 340, and may further comprise a buffer 350 and a lower layer 360, where the plurality of data compression circuits 340 may comprise a set of data compression circuits {DCM(1), DCM(2), ..., DCM(X−1)} (labeled "Data compression" in FIG. 3, for brevity) that operate according to associated data-compression control parameters {(A(1), n(1)), (A(2), n(2)), ..., (A(X−1), n(X−1))}, respectively. The apparatus 300 may be taken as an example of the apparatus mentioned above, and the set of data compression circuits {DCM(1), DCM(2), ..., DCM(X−1)} may be taken as examples of the plurality of data compression modules.

According to this embodiment, the entropy-based classification circuit 330 may be arranged to perform entropy-based classification. More particularly, the entropy-based classification circuit 330 may perform entropy detection on the plurality of sets of partial data to generate entropy detection values of the plurality of sets of partial data, respectively (e.g. the operation of Step S21), and may classify the plurality of sets of partial data according to the entropy detection values of the plurality of sets of partial data, respectively, to perform data compression on the aforementioned at least one portion of the plurality of sets of partial data through the plurality of data compression modules, respectively (e.g. the operation of Step S22). As shown in FIG. 3, the plurality of sets of partial data may be divided into different entropy levels of partial data, such as one or more sets of partial data of a first entropy level EL(1), one or more sets of partial data of a second entropy level EL(2), ..., one or more sets of partial data of an $(X-1)^{th}$ entropy level EL(X−1), and one or more sets of partial data of an $X^{th}$ entropy level EL(X).

In addition, a classification result of the aforementioned any set of partial data may indicate whether the entropy detection value of the aforementioned any set of partial data falls within a predetermined range (e.g. a certain range for determining whether data compression is required). In response to the classification result, the entropy-based classification circuit 330 may determine whether to perform data compression on this set of partial data through one of the plurality of data compression modules, where whether to perform data compression on this set of partial data corresponds to whether the entropy detection value falls within the predetermined range. Assume that the symbol "t" represents a predetermined threshold. Taking the average number of bits required for expressing the data unit (e.g. e) as an example of the entropy detection value, if (e/8)<t (i.e. e<(8*t)), the entropy-based classification circuit 330 determines that data compression is required; otherwise, which means (e/8)≥t (i.e. e≥(8*t)), the entropy-based classification circuit 330 determines that data compression is not required. For example, the classification result may indicate that this set of partial data belongs to the $X^{th}$ entropy level EL(X) (e.g. in a situation where (e/8)≥t), and the entropy-based classification circuit 330 may send this set of partial data toward the buffer 350, for being stored into the lower layer 360. For another example, the classification result may indicate that this set of partial data belongs to a detected entropy level EL(x0) thereof within the other entropy levels {EL(1), EL(2), ..., EL(X−1)} (e.g. in a situation where (e/8)<t), and the entropy-based classification circuit 330 may send this set of partial data toward the data compression circuit DCM(x0) corresponding to the detected entropy level EL(x0) (e.g. one of the data compression circuits {DCM(1), DCM(2), ..., DCM(X−1)}), where the symbol x0 may represent a positive integer falling within the interval [1, X−1]. As a result, the data compression circuit DCM(x0) may perform data compression on this set of partial data to generate the compressed data CD(x0) thereof (e.g. one of the compressed data {CD(1), CD(2), ..., CD(X−1)}), and send the compressed data CD(x0) toward the buffer 350, for being stored into the lower layer 360.

Based on the architecture shown in FIG. 1, the control circuit in the apparatus 300 shown in FIG. 3 may be implemented with the processing circuit 110 running the data-compression management module 112. In this situation, the upper layer 310 and the lower layer 360 may represent a user request layer (e.g. a file system of an operating system (OS) of the storage server 100) and the storage device 130, respectively, the buffer 350 may represent a memory within the storage server 100 (e.g. a Static RAM (SRAM) or a Dynamic RAM (DRAM), which may be positioned in the processing circuit 110 or the storage interface circuit 120), and the host interface circuit 320, the entropy-based classification circuit 330, and the plurality of data compression circuits 340 may represent the processing circuit 110 running the associated sub-modules of the data-compression management module 112, respectively.

Figure 4:
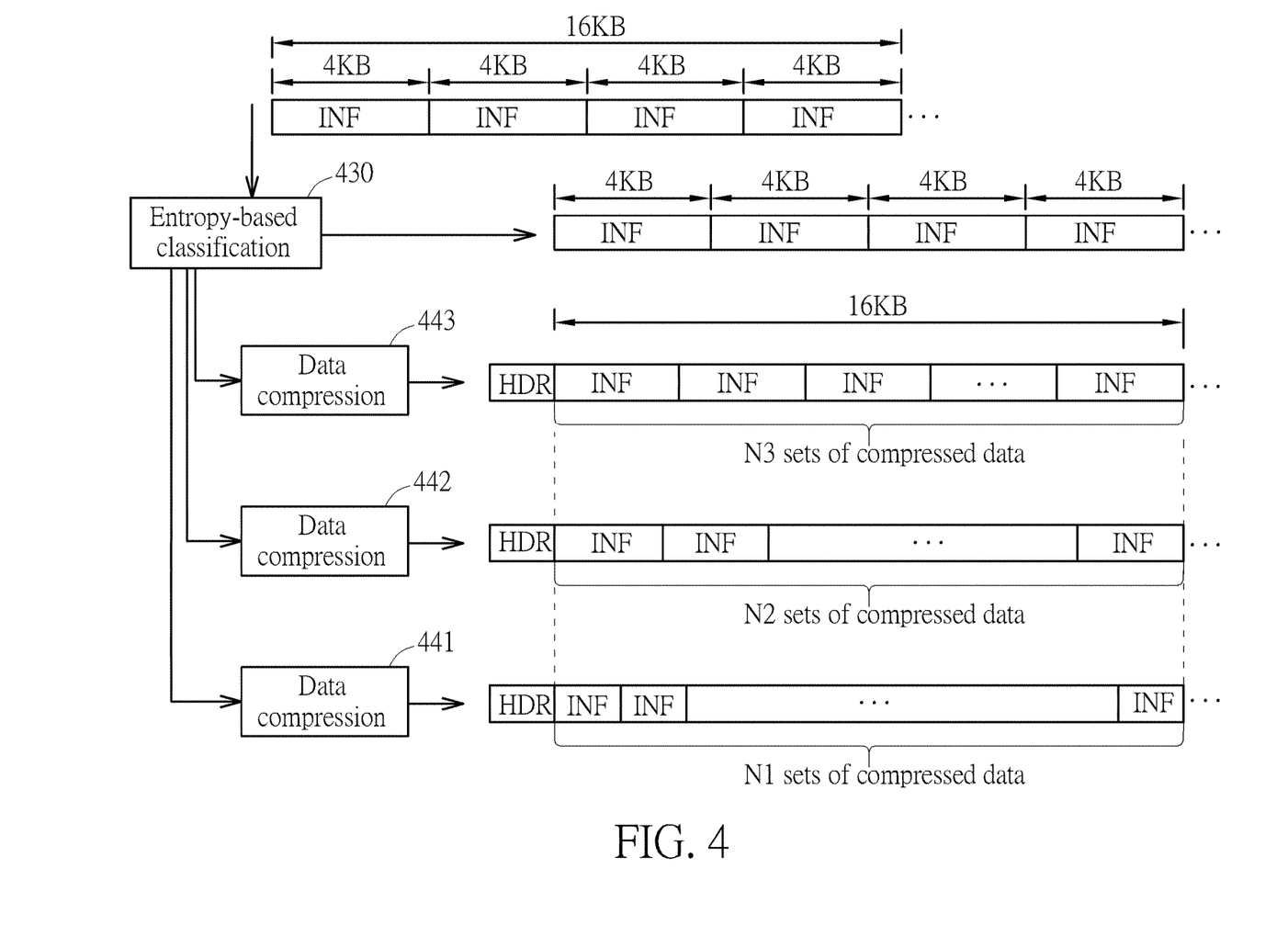
FIG. 4 illustrates some implementation details of the control scheme shown in FIG. 3 according to an embodiment of the present invention.

FIG. 4 illustrates some implementation details of the control scheme shown in FIG. 3 according to an embodiment of the present invention. The entropy-based classification circuit 430 (labeled "Entropy-based classification" in FIG. 4, for brevity) may be taken as an example of the entropy-based classification circuit 330, and the data compression circuits 441, 442, and 443 (labeled "Data compression" in FIG. 4, for brevity) may be taken as examples of the data compression circuits {DCM(1), DCM(2), . . . , DCM(X−1)}, respectively, where X=4 in this embodiment.

According to this embodiment, the aforementioned at least one portion of the plurality of sets of partial data may comprise a first set of partial data (e.g. partial data of a higher entropy level) and a second set of partial data (e.g. partial data of a lower entropy level). For better comprehension, the first set of partial data may have a complicated mixture of bits 0 and 1 (e.g. 70% and 30% within all bits of the first set of partial data, respectively, or 30% and 70% within all bits of the first set of partial data, respectively), and the second set of partial data may have a non-complicated mixture of bits 0 and 1 (e.g. 99.99% and 0.01% within all bits of the second set of partial data, respectively, or 0.01% and 99.99% within all bits of the second set of partial data, respectively), but the present invention is not limited thereto. For example, a first classification result of the first set of partial data indicates that a first entropy detection value of the first set of partial data falls within a first sub-range of the predetermined range, and a second classification result of the second set of partial data indicates that a second entropy detection value of the second set of partial data falls within a second sub-range of the predetermined range.

In addition, in response to the first classification result, the entropy-based classification circuit 430 may perform data compression on the first set of partial data through a first data compression module of the plurality of data compression modules, such as one of the data compression circuits 441, 442, and 443, where the first sub-range of the predetermined range is associated with the first data compression module. In response to the second classification result, the entropy-based classification circuit 430 may perform data compression on the second set of partial data through a second data compression module of the plurality of data compression modules, such as another one of the data compression circuits 441, 442, and 443, where the second sub-range of the predetermined range is associated with the second data compression module. For example, within the plurality of data compression modules such as the data compression circuits 441, 442, and 443, a first data compression module corresponding to a first level of compression capability may be utilized as the first data compression module, and a second data compression module corresponding to a second level of compression capability may be utilized as the second data compression module. Assume that the first entropy detection value of the first set of partial data is greater than the second entropy detection value of the second set of partial data. The entropy-based classification circuit 430 may utilize the first data compression module corresponding to the first level of compression capability and the second data compression module corresponding to the second level of compression capability to perform data compression on the first set of partial data and the second set of partial data, respectively, where the first level of compression capability is lower than the second level of compression capability.

As shown in FIG. 4, the entropy-based classification circuit 430 may receive the data in units of 16 kilobytes (KB), and each set of the plurality of sets of partial data may have a common size of 4 KB, where the plurality of sets of partial data may carry respective information (INF). For example, the entropy-based classification circuit 430 may send the one or more sets of partial data of the $X^{th}$ entropy level EL(X) (e.g. X=4 in this embodiment) as non-compressed data toward the buffer 350, such as those illustrated at the right-hand side of the entropy-based classification circuit 430. The entropy-based classification circuit 430 may send the one or more sets of partial data of the $(X−1)^{th}$ entropy level EL(X−1) (e.g. (X−1)=3 in this embodiment) toward the data compression circuit DCM(X−1) such as the data compression circuit 443, to generate the compressed data CD(X−1) such as those illustrated at the right-hand side of the data compression circuit 443. The entropy-based classification circuit 430 may send the one or more sets of partial data of the second entropy level EL(2) toward the data compression circuit DCM(2) such as the data compression circuit 442, to generate the compressed data CD(2) such as those illustrated at the right-hand side of the data compression circuit 442. The entropy-based classification circuit 430 may send the one or more sets of partial data of the first entropy level EL(1) toward the data compression circuit DCM(1) such as the data compression circuit 441, to generate the compressed data CD(1) such as those illustrated at the right-hand side of the data compression circuit 441.

In addition, the data compression circuit DCM(x0) (e.g. x0=1, 2, or 3 in this embodiment) such as one of the data compression circuits 441, 442, and 443 may generate a series of compressed data, such as compressed versions of N_x0 (e.g. N1, N2, or N3) sets of partial data of the detected entropy level EL(x0), and may add a header (HDR) corresponding to the series of compressed data, where the header may indicate the respective locations of the series of compressed data. For example, in a situation where x0=1 and N_x0=N1, the data compression circuits 441 may generate N1 sets of compressed data (e.g. the compressed versions of the N1 sets of partial data of the entropy level EL(1)) with the corresponding header, such as those illustrated at the right-hand side of the data compression circuit 441. In a situation where x0=2 and N_x0=N2, the data compression circuits 442 may generate N2 sets of compressed data (e.g. the compressed versions of the N2 sets of partial data of the entropy level EL(2)) with the corresponding header, such as those illustrated at the right-hand side of the data compression circuit 442. In a situation where x0=3 and N_x0=N3, the data compression circuits 443 may generate N3 sets of compressed data (e.g. the compressed versions of the N3 sets of partial data of the entropy level EL(3)) with the corresponding header, such as those illustrated at the right-hand side of the data compression circuit 443.

According to some embodiments, a set of partial data within the N1 sets of partial data of the entropy level EL(1) may have a non-complicated mixture of bits 0 and 1. For example, 95% or above of all bits of the set of partial data may be bit 0, or 95% or above of all bits of the set of partial data may be bit 1. In addition, a set of partial data within the N2 sets of partial data of the entropy level EL(2) may have a slightly complicated mixture of bits 0 and 1. For example, 90%-95% of all bits of the set of partial data may be bit 0, or 90%-95% of all bits of the set of partial data may be bit 1. Additionally, a set of partial data within the N3 sets of partial data of the entropy level EL(3) may have a complicated mixture of bits 0 and 1. For example, 60%-90% of all bits of the set of partial data may be bit 0, or 60%-90% of all bits of the set of partial data may be bit 1. Further, a set of partial data of the entropy level EL(4) may have an extremely complicated mixture of bits 0 and 1. For example, 50%-60% of all bits of the set of partial data may be bit 0, or 50%-60% of all bits of the set of partial data may be bit 1.

Figure 5:
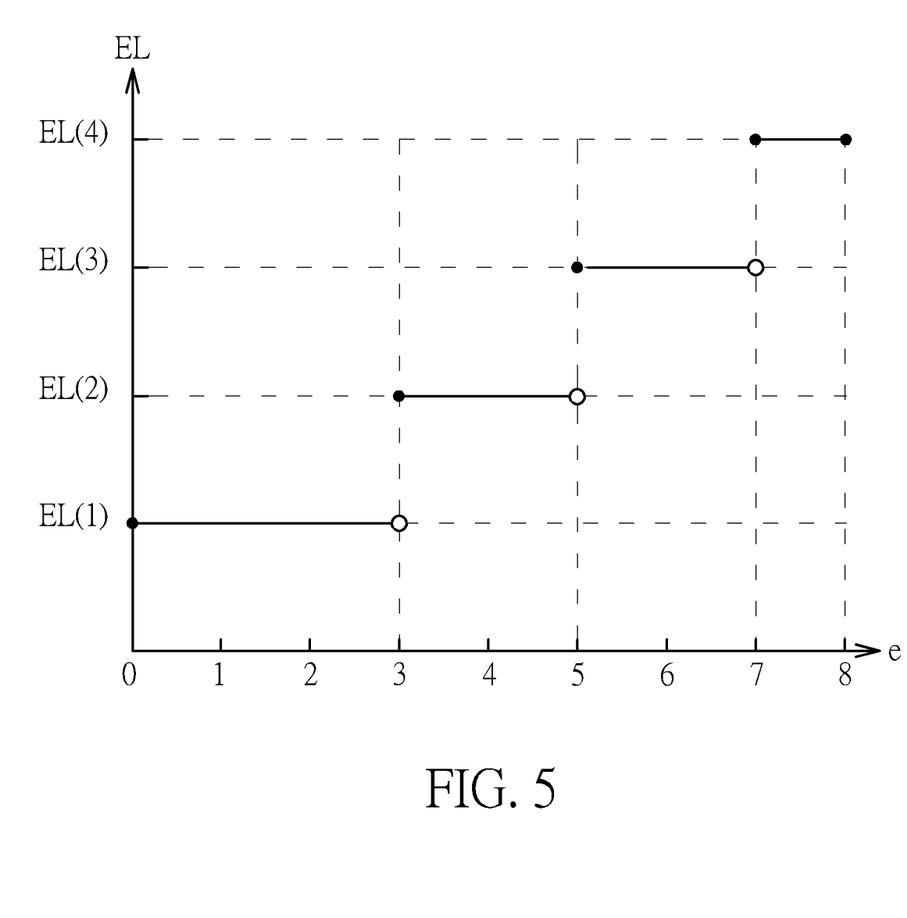
FIG. 5 illustrates mapping relationships between the entropy level and the entropy detection value of the method according to an embodiment of the present invention.

FIG. 5 illustrates mapping relationships between the entropy level EL and the entropy detection value e of the method according to an embodiment of the present invention, where the entropy detection value e may fall within the interval [0, 8] in this embodiment, but the present invention is not limited thereto. For example, if the entropy detection value e is less than 3, the entropy level EL may be equal to the entropy level EL(1); if the entropy detection value e reaches (e.g. greater than or equal to) 3 and is less than 5, the entropy level EL may be equal to the entropy level EL(2); if the entropy detection value e reaches (e.g. greater than or equal to) 5 and is less than 7, the entropy level EL may be equal to the entropy level EL(3); otherwise (e.g. the entropy detection value e is greater than or equal to 7), the entropy level EL may be equal to the entropy level EL(4).

Figure 6:
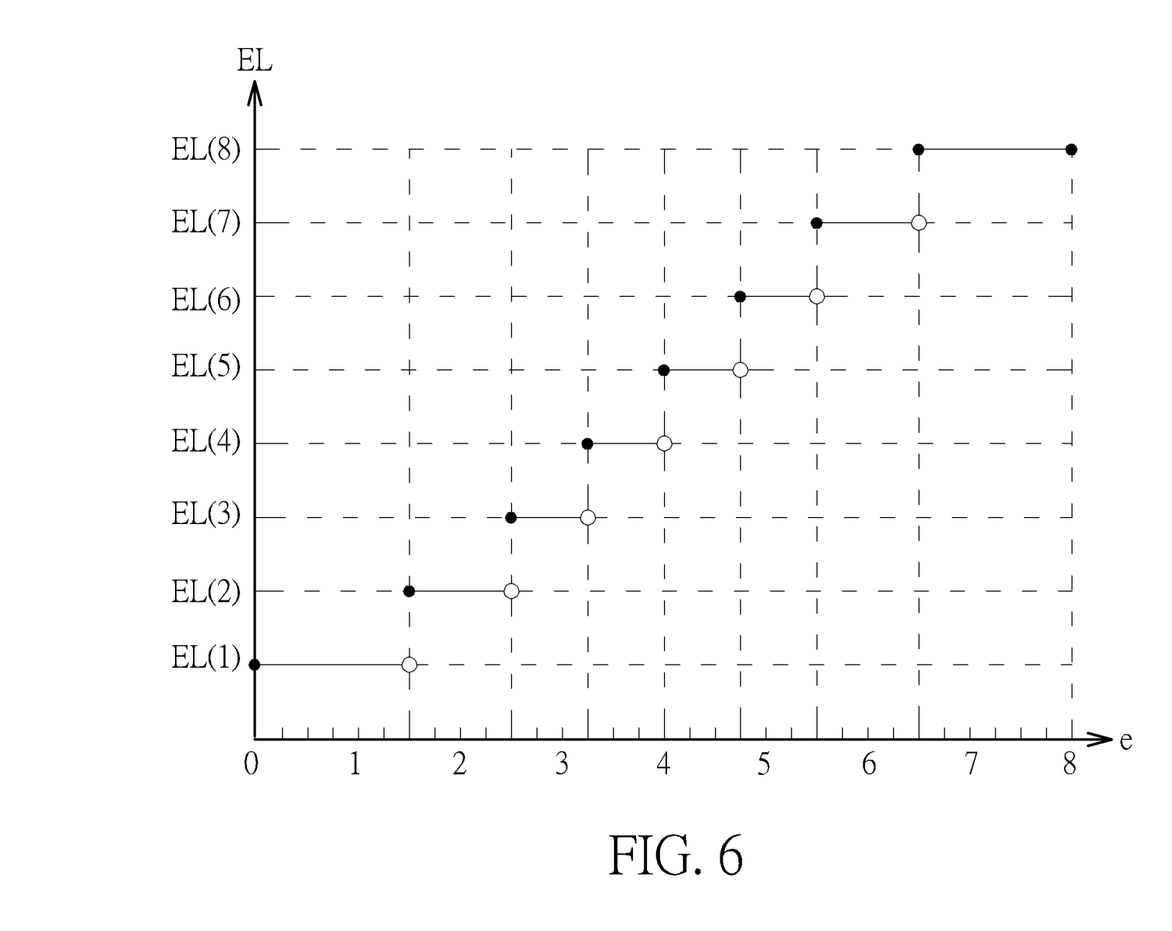
FIG. 6 illustrates mapping relationships between the entropy level and the entropy detection value of the method according to another embodiment of the present invention.

FIG. 6 illustrates mapping relationships between the entropy level EL and the entropy detection value e of the method according to another embodiment of the present invention, where the entropy detection value e may fall within the interval [0, 8] in this embodiment, but the present invention is not limited thereto. For example, if the entropy detection value e is less than 1.5, the entropy level EL may be equal to the entropy level EL(1); if the entropy detection value e reaches (e.g. greater than or equal to) 1.5 and is less than 2.5, the entropy level EL may be equal to the entropy level EL(2); if the entropy detection value e reaches (e.g. greater than or equal to) 2.5 and is less than 3.25, the entropy level EL may be equal to the entropy level EL(3); if the entropy detection value e reaches (e.g. greater than or equal to) 3.25 and is less than 4, the entropy level EL may be equal to the entropy level EL(4); if the entropy detection value e reaches (e.g. greater than or equal to) 4 and is less than 4.75, the entropy level EL may be equal to the entropy level EL(5); if the entropy detection value e reaches (e.g. greater than or equal to) 4.75 and is less than 5.5, the entropy level EL may be equal to the entropy level EL(6); if the entropy detection value e reaches (e.g. greater than or equal to) 5.5 and is less than 6.5, the entropy level EL may be equal to the entropy level EL(7); otherwise (e.g. the entropy detection value e is greater than or equal to 6.5), the entropy level EL may be equal to the entropy level EL(8). According to this embodiment, most sets of partial data within the plurality of sets of partial data are detected to have the entropy detection value e falling within the interval [2.5, 5.5], and therefore, there are more level transitions in the interval [2.5, 5.5] than in other intervals [0, 2.5] and [5.5, 8].

Figure 7:
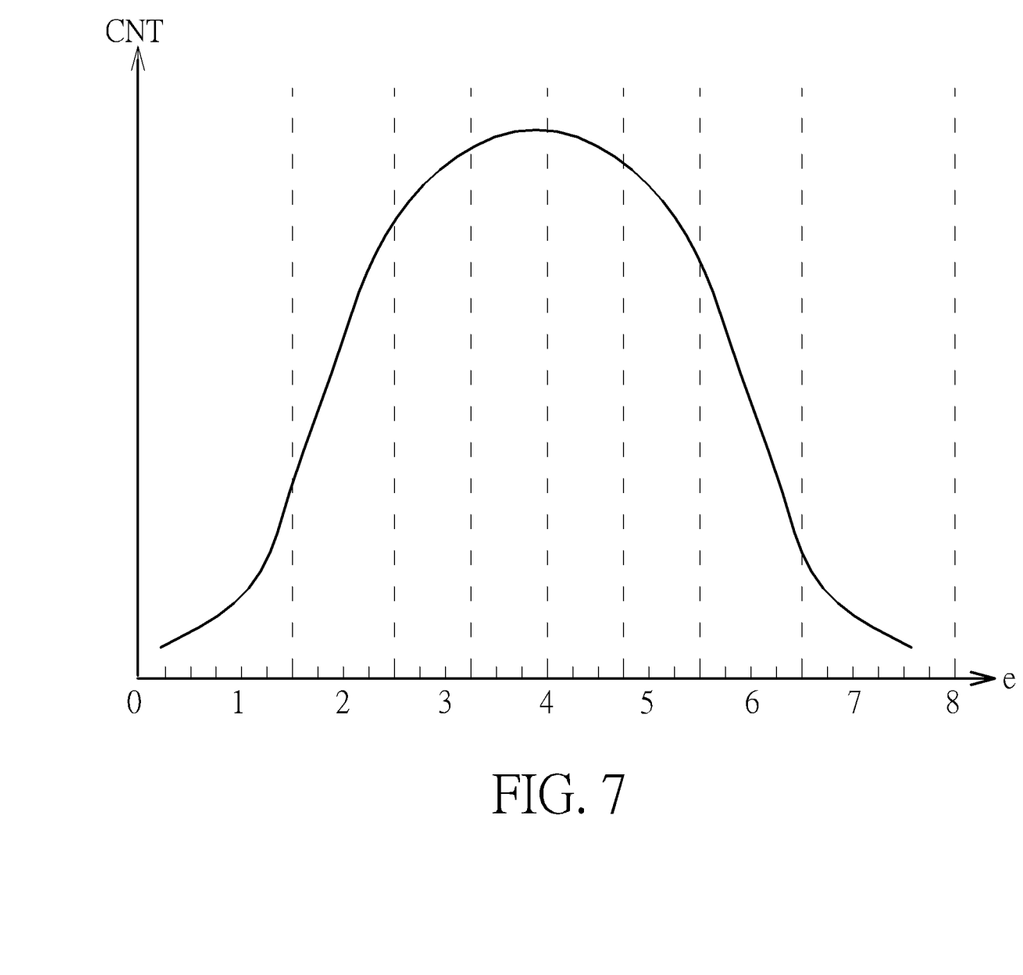
FIG. 7 illustrates an example of a data distribution curve in the embodiment shown in FIG. 6.

FIG. 7 illustrates an example of a data distribution curve in the embodiment shown in FIG. 6. The horizontal axis shown in FIG. 7 may represent the entropy detection value e and may have the same scale as that of FIG. 6, and the vertical axis shown in FIG. 7 may represent the data amount CNT corresponding to a certain value of the entropy detection value e, such as the number of sets of partial data corresponding to the certain value of the entropy detection value e. Referring to the curve shown in FIG. 7, in comparison with the case of the entropy detection value e falling within any of the other intervals [0, 2.5] and [5.5, 8], the data amount CNT is greater for the case of the entropy detection value e falling within the interval [2.5, 5.5], indicating that most sets of partial data within the plurality of sets of partial data are detected to have the entropy detection value e falling within the interval [2.5, 5.5]. As a result, in FIG. 6, there are more level transitions in the interval [2.5, 5.5] than in the other intervals [0, 2.5] and [5.5, 8].

Figure 8:
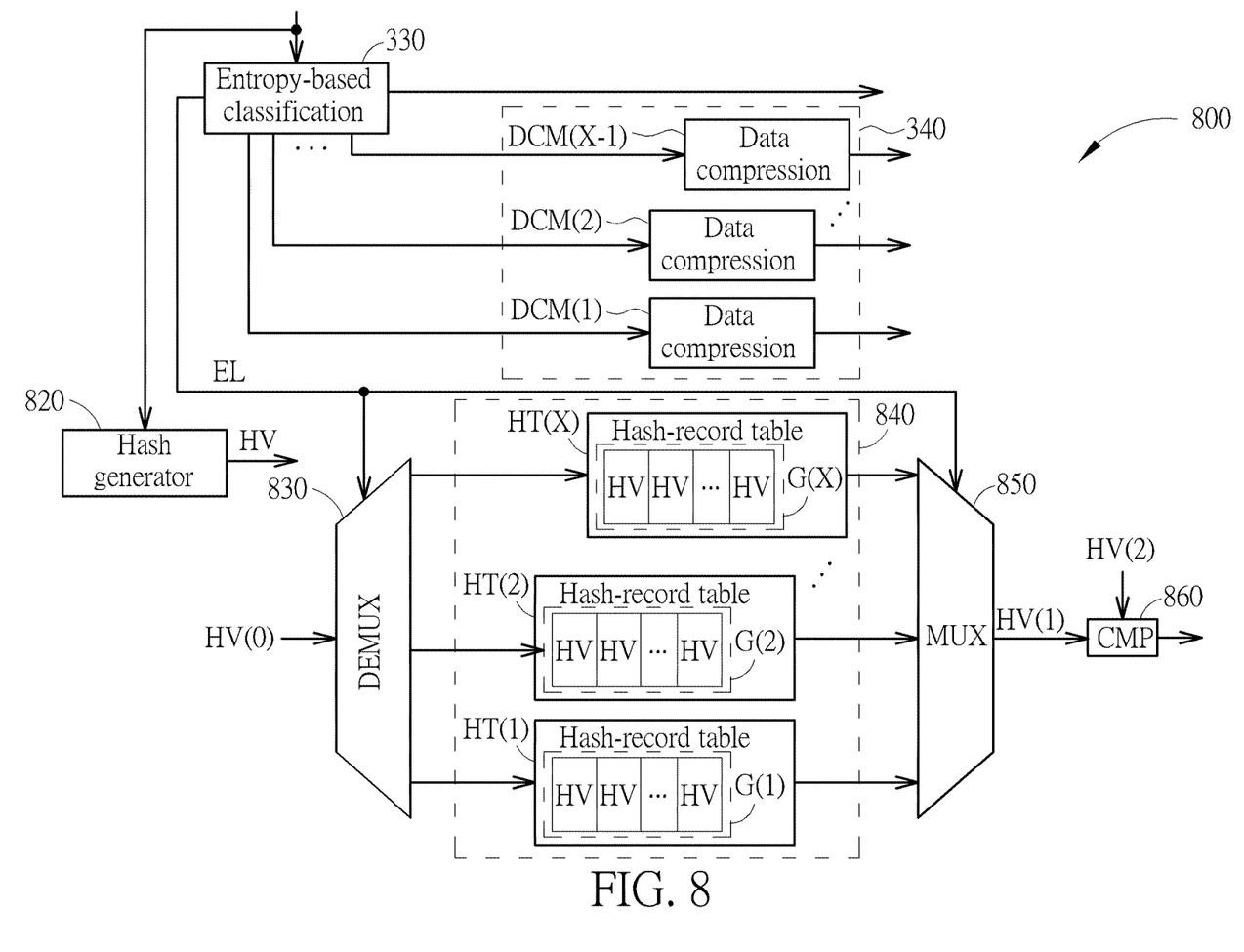
FIG. 8 illustrates a control scheme of the method according to another embodiment of the present invention.

FIG. 8 illustrates a control scheme of the method according to another embodiment of the present invention. The apparatus 800 shown in FIG. 8 may be taken as an example of the apparatus 300 shown in FIG. 3. In addition to the components in the architecture shown in FIG. 3, the apparatus 800 may further comprise a hash generator 820, a de-multiplexer 830 (labeled "DEMUX" in FIG. 8, for brevity), a plurality of hash-record tables 840, a multiplexer 850 (labeled "MUX" in FIG. 8, for brevity), and a comparator 860 (labeled "CMP" in FIG. 8, for brevity), where the plurality of hash-record tables 840 may comprise a set of hash-record tables {HT(1), HT(2), . . . , HT(X)} respectively corresponding to the entropy levels {EL(1), EL(2), . . . , EL(X)}.

According to this embodiment, the hash generator 820 may generate a plurality of hash values of the plurality of sets of partial data, respectively, such as a series of hash values {HV} output from the hash generator 820. For example, the de-multiplexer 830 may receive a hash value of a certain set of partial data (e.g. a hash value of the series of hash values {HV}) as the hash value HV(0), and may perform de-multiplexing on the hash value HV(0) according to a classification result of this set of partial data, where the entropy level EL shown in FIG. 8 at this moment (e.g. one of the entropy levels {EL(1), EL(2), . . . , EL(X)}) may represent the classification result of this set of partial data. For better comprehension, assume that the entropy level EL shown in FIG. 8 at this moment is equal to the entropy level EL(x) (e.g. the symbol x may represent a positive integer falling within the interval [1, X]). The classification result of this set of partial data, such as the entropy level EL(x), may indicate that the hash value of this set of partial data should be stored into the corresponding hash-record table HT(x) within the set of hash-record tables {HT(1), HT(2), . . . , HT(X)}. Similar operations may be performed on some other hash values in the series of hash values {HV}. As a result, according to classification of the plurality of sets of partial data, the apparatus 800 may store a plurality of groups of hash values {G(1), G(2), . . . , G(X)} within the plurality of hash values into the plurality of hash-record tables 840 such as the set of hash-record tables {HT(1), HT(2), . . . , HT(X)}, respectively. For example, the plurality of groups of hash values {G(1), G(2), . . . , G(X)} may correspond to different possible ranges of the entropy detection values, such as X possible ranges of the entropy detection value e (e.g. the four ranges of the entropy detection value e that are divided by the vertical dashed lines shown in FIG. 5, or the eight ranges of the entropy detection value e that are divided by the vertical dashed lines shown in FIG. 6), respectively.

In addition, in response to a comparison result regarding comparison between a hash value HV(2) of a current set of partial data within the data and a hash value HV(1) within one of the plurality of groups of hash values {G(1), G(2), . . . , G(X)}, the apparatus 800 may perform de-duplicate processing on the current set of partial data. For example, the multiplexer 850 may select a hash-record table from the plurality of hash-record tables 840 according to a classification result of the current set of partial data, where the entropy level EL shown in FIG. 8 at this moment (e.g. one of the entropy levels {EL(1), EL(2), . . . , EL(X)}) may represent the classification result of the current set of partial data. For better comprehension, assume that the entropy level EL shown in FIG. 8 at this moment is equal to the entropy level EL(x2) (e.g. the symbol x2 may represent a positive integer falling within the interval [1, X]). The classification result of the current set of partial data, such as the entropy level EL(x2), may indicate that the hash-record table HT(x2) should be selected from the set of hash-record tables {HT(1), HT(2), ..., HT(X)}. As a result, the multiplexer 850 may select the hash-record table HT(x2) from the set of hash-record tables {HT(1), HT(2), ..., HT(X)} according to this classification result such as the entropy level EL(x2), where the hash-record table HT(x2) stores the aforementioned one of the plurality of groups of hash values {G(1), G(2), ..., G(X)}, such as the group of hash value G(x2).

Please note that the hash value HV(1) may represent a hash value of a previous set of partial data, where the plurality of sets of partial data may comprise the previous set of partial data, and the plurality of hash values may comprise the hash value of the previous set of partial data. The hash value of the previous set of partial data, such as the hash value HV(1), has been stored into the hash-record table HT(x2) in advance, to be a hash value of the group of hash value G(x2). The aforementioned hash value of the certain set of partial data may be taken as an example of the hash value of the previous set of partial data, and the operations performed on the hash value of the previous set of partial data may be similar to that performed on the aforementioned hash value of the certain set of partial data. For example, regarding storing the hash value of the previous set of partial data in advance, the apparatus 800 may have selected the hash-record table HT(x2) from the plurality of hash-record tables 840 according to the classification result of the previous set of partial data, and may have stored the hash value of the previous set of partial data into the hash-record table HT(x2), where the hash value within the aforementioned one of the plurality of groups of hash values may represent the hash value of the previous set of partial data.

Therefore, the apparatus 800 may utilize the multiplexer 850 to obtain the hash value of the previous set of partial data from the hash-record table HT(x2) to be the hash value HV(1). In addition, the apparatus 800 may utilize the comparator 860 to compare the hash value of the current set of partial data (e.g. the hash value HV(2)) with the hash value of the previous set of partial data (e.g. the hash value HV(1)) to generate the comparison result, where the comparison result may indicate that the hash value of the current set of partial data matches (more particularly, is equal to) the hash value of the previous set of partial data. As a result, the apparatus 800 may perform de-duplicate processing on the current set of partial data with respect to the previous set of partial data to save the storage space of the storage server 100. For example, the apparatus 800 may store link information (e.g. a hard-link, etc.) of the current set of partial data for referring to the previous set of partial data, and may read the data contents of the previous set of partial data as the data contents of the current set of partial data when needed, but the present invention is not limited thereto.

Based on the control scheme shown in FIG. 8, the apparatus 800 can easily and efficiently perform hash comparison, and does not need to compare the hash value of the current set of partial data (e.g. the hash value HV(2)) with every existing hash value that has been stored (e.g. each of the hash values that have been stored within the plurality of hash-record tables 840). Within the plurality of sets of partial data, various sets carrying different contents of information should have different hash values, respectively. As any two sets of partial data corresponding to different classification results (e.g. partial data of different entropy detection levels) should carry different contents of information, respectively, and as the respective hash values of the aforementioned any two sets of partial data corresponding to different classification results should be stored into different groups within the plurality of groups of hash values {G(1), G(2), ..., G(X)}, respectively, it is unnecessary to compare the respective hash values of the aforementioned any two sets of partial data corresponding to different classification results. The apparatus 800 can compare the hash value of the current set of partial data (e.g. the hash value HV(2)) with that of the selected group, such as the hash value of the previous set of partial data (e.g. the hash value HV(1)), to prevent unnecessary comparison (e.g. comparing the respective hash values of the aforementioned any two sets of partial data corresponding to different classification results), and therefore to increase the overall hash comparison speed before determining whether de-duplicate processing can be performed on the current set of partial data. As a result, the overall compression speed can be greatly increased and preparation (e.g. hash comparison) for performing de-duplicate processing can be performed very fast. In comparison with the related art, the storage server 100 implemented according to the present invention can have better performance.

Some details related to the control scheme shown in FIG. 8 may be described as follows. According to some embodiments, the comparison result may indicate that the hash value of the current set of partial data should belong to the same group as the aforementioned one of the plurality of groups of hash values. For example, the comparison result may indicate that the hash value of the current set of partial data is equal to the hash value of the previous set of partial data. In this situation, the current set of partial data should have the same contents of information as that of the previous set of partial data. For brevity, similar descriptions for these embodiments are not repeated in detail here.

According to some embodiments, the apparatus 800 is capable of selecting a hash-record table from the plurality of hash-record tables 840 according to the classification result of the aforementioned any set of partial data, for storing a hash value of this set of partial data. For example, when the aforementioned any set of partial data represents the aforementioned certain set of partial data, the classification result and the hash-record table may represent the entropy level EL(x) and the corresponding hash-record table HT(x), respectively. For brevity, similar descriptions for these embodiments are not repeated in detail here.

Based on the architecture shown in FIG. 1, the control circuit in the apparatus 800 shown in FIG. 8 may be implemented with the processing circuit 110 running the data-compression management module 112. In this situation, the upper layer 310 and the lower layer 360 of the apparatus 800 (such as that of the apparatus 300 shown in FIG. 3) may represent the aforementioned user request layer (e.g. the file system of the OS of the storage server 100) and the storage device 130, respectively, the buffer 350 of the apparatus 800 (such as that of the apparatus 300 shown in FIG. 3) may represent the aforementioned memory within the storage server 100 (e.g. the SRAM or the DRAM, which may be positioned in the processing circuit 110 or the storage interface circuit 120), and the host interface circuit 320 of the apparatus 800 (such as that of the apparatus 300 shown in FIG. 3) and the entropy-based classification circuit 330, the plurality of data compression circuits 340, the hash generator 820, the de-multiplexer 830, the plurality of hash-record tables 840, the multiplexer 850, and the comparator 860 may represent the processing circuit 110 running the associated sub-modules of the data-compression management module 112, respectively.

As described in some of the above embodiments, the control circuit may be implemented to be the processing circuit 110 of the storage server 100, such as the processing circuit 110 running the data-compression management module 112. This is for illustrative purposes only, and is not meant to be a limitation of the present invention. According to some embodiments, the control circuit may be implemented to be a storage interface circuit coupled between the aforementioned at least one storage device and the processing circuit 110 of the storage server 100, such as the storage interface circuit 120 of the embodiment shown in FIG. 9.

Figure 9:
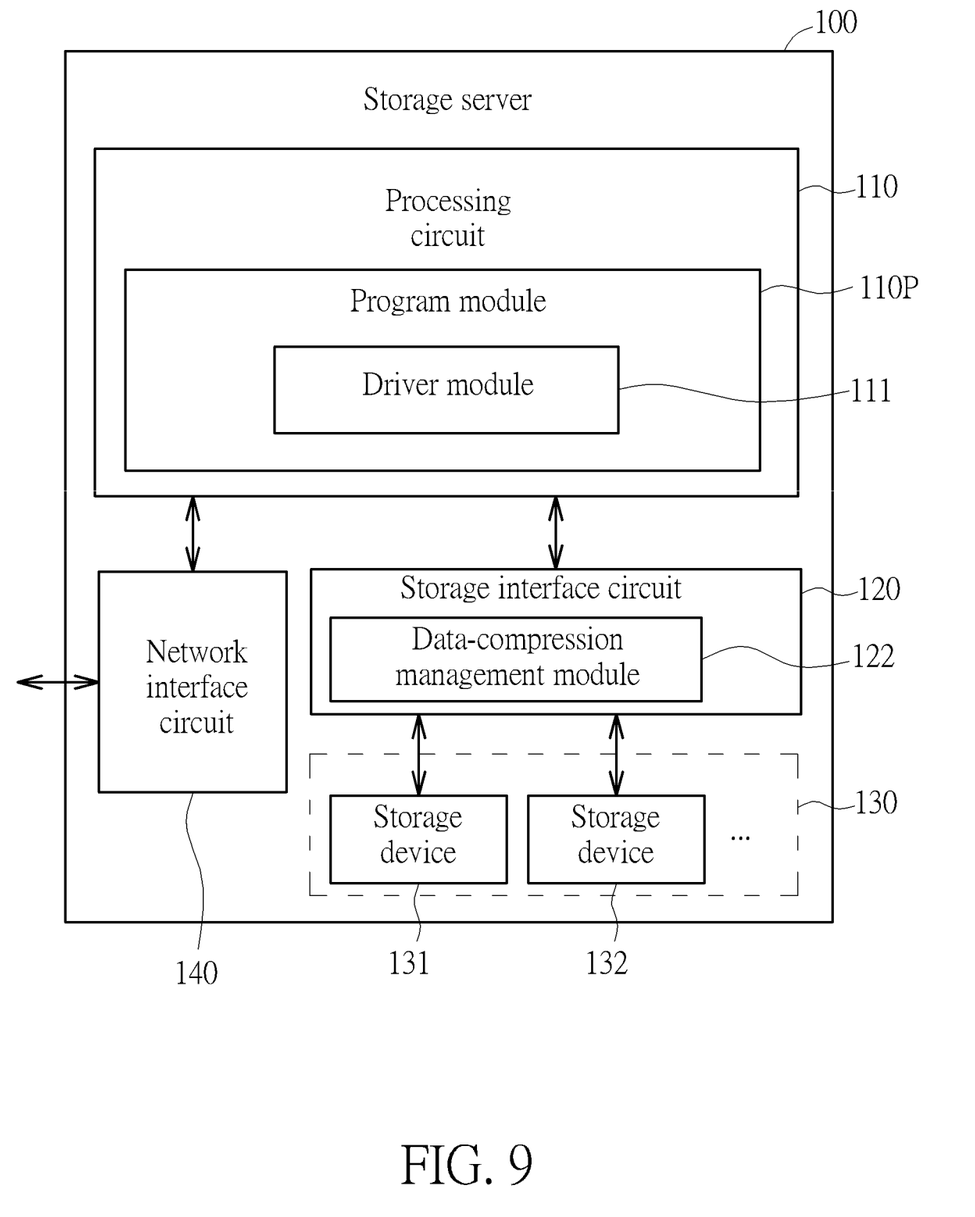
FIG. 9 is a diagram of a storage server according to another embodiment of the present invention.

FIG. 9 is a diagram of a storage server according to another embodiment of the present invention. In comparison with the architecture shown in FIG. 1, the storage interface circuit 120 of this embodiment may comprise a data-compression management module 122 for controlling the storage server 100 to operate according to the method, and a driver module 111 running on the processing circuit 110 may be arranged to communicate with the data-compression management module 122, in order to perform one or more associated settings when needed, where the data-compression management module 122 may be implemented as a sub-circuit of the storage interface circuit 120, such as an application-specific integrated circuit (ASIC), but the present invention is not limited thereto. For better comprehension, the storage server 100 and the associated circuits/modules/devices in the architecture shown in FIG. 9 (e.g. the processing circuit 110 running the program modules 110P, and the storage interface circuit 120 comprising the data-compression management module 122) may be taken as examples of the aforementioned storage server and the associated circuits/modules/devices thereof (e.g. the processing circuit running the one or more program modules corresponding to the method, and the storage interface circuit comprising the one or more sub-circuits corresponding to the method), respectively. For brevity, similar descriptions for this embodiment are not repeated in detail here.

According to some embodiments, the driver module 111 may be omitted. For example, the program module 110P may comprise a newer version of the OS, and it is unnecessary to install the driver module 111 into the storage server 100. For brevity, similar descriptions for these embodiments are not repeated in detail here.

Based on the architecture shown in FIG. 9, the control circuit in the apparatus 300 shown in FIG. 3 may be implemented with the storage interface circuit 120 comprising the data-compression management module 122. In this situation, the upper layer 310 and the lower layer 360 may represent the aforementioned user request layer (e.g. the file system of the OS of the storage server 100) and the storage device 130, respectively, the buffer 350 may represent the aforementioned memory within the storage server 100 (e.g. a dedicated memory that may be implemented with SRAM or DRAM and positioned in the storage interface circuit 120 or the data-compression management module 122), and the host interface circuit 320, the entropy-based classification circuit 330, and the plurality of data compression circuits 340 may be positioned within the data-compression management module 122, and more particularly, may be the associated sub-circuits of the ASIC, respectively.

In addition, based on the architecture shown in FIG. 9, the control circuit in the apparatus 800 shown in FIG. 8 may be implemented with the storage interface circuit 120 comprising the data-compression management module 122. In this situation, the upper layer 310 and the lower layer 360 of the apparatus 800 (such as that of the apparatus 300 shown in FIG. 3) may represent the aforementioned user request layer (e.g. the file system of the OS of the storage server 100) and the storage device 130, respectively, the buffer 350 of the apparatus 800 (such as that of the apparatus 300 shown in FIG. 3) may represent the aforementioned memory within the storage server 100 (e.g. the dedicated memory that may be implemented with SRAM or DRAM and positioned in the storage interface circuit 120 or the data-compression management module 122), and the host interface circuit 320 of the apparatus 800 (such as that of the apparatus 300 shown in FIG. 3) and the entropy-based classification circuit 330, the plurality of data compression circuits 340, the hash generator 820, the de-multiplexer 830, the plurality of hash-record tables 840, the multiplexer 850, and the comparator 860 may be positioned within the data-compression management module 122, and more particularly, may be the associated sub-circuits of the ASIC, respectively.

According to some embodiments, the control circuit (e.g. the storage interface circuit 120 comprising the data-compression management module 122 as shown in FIG. 9) may be implemented to be a storage interface card (e.g. a hardware acceleration card) for being installed in the storage server 100. For brevity, similar descriptions for these embodiments are not repeated in detail here.

According to some embodiments, within the aforementioned different entropy levels of partial data, the one or more sets of partial data of the first entropy level EL(1) (e.g. the N1 sets of partial data of the entropy level EL(1)) may be regarded as partial data of a pattern type, the one or more sets of partial data of the second entropy level EL(2) (e.g. the N2 sets of partial data of the entropy level EL(2)) may be regarded as partial data of an intermediate type, . . . , and the one or more sets of partial data of the $(X-1)^{th}$ entropy level EL(X-1) (e.g. the N3 sets of partial data of the entropy level EL(3)) may be regarded as partial data of a normal type, but the present invention is not limited thereto.

According to some embodiments, the operation of Step S23 may be performed in a redirect-on-write (ROW) manner, but the present invention is not limited thereto. According to some embodiments, the address mapping information mentioned in Step S23 may comprise mapping information of a mapping relationship between an upper-layer address of the upper layer 310 (e.g. a logical address of the file system of the OS) and a lower-layer address of the lower layer 360 (e.g. a logical address for accessing the lower layer 360) for the partial data (e.g. the aforementioned any set of partial data). As the lower layer 360 may represent the storage device 130, and as the lower-layer address is more related to a physical storage medium of the storage device 130 than the upper-layer address, the upper-layer address and the lower-layer address may also be referred to as the logical address (LA) and the pseudo-physical address (PPA) for the partial data. For example, the storage server 100 (e.g. the control circuit) may store the address mapping information into an address mapping table (e.g. a LA-to-PPA (L2P) table), and may manage or update the address mapping table (e.g. the L2P table) when needed. In addition, the storage server 100 (e.g. the control circuit) may store reverse-mapping information of the address mapping information into one or more other address mapping tables (e.g. one or more PPA-to-LA (P2L) tables), and may manage or update the one or more other address mapping tables (e.g. the one or more P2L tables) when needed. For example, the one or more other address mapping tables may comprise X address mapping tables respectively corresponding to the entropy levels {EL(1), EL(2), ..., EL(X)}, but the present invention is not limited thereto.

According to some embodiments, the storage server 100 (e.g. the control circuit) may control the storage device 130 to store the address mapping information into the address mapping table (e.g. the L2P table) and to manage or update the address mapping table (e.g. the L2P table) when needed. In addition, the storage server 100 (e.g. the control circuit) may control the storage device 130 to store the reverse-mapping information of the address mapping information into the one or more other address mapping tables (e.g. the one or more P2L tables) and to manage or update the one or more other address mapping tables (e.g. the one or more P2L tables) when needed.

According to some embodiments, the storage server 100 (e.g. the control circuit) may detect a data chunk having the same bit (e.g. bit 0, or bit 1), such as an all-zero chunk having the same bit 0 or an all-one chunk having the same bit 1, and may record address information of the data chunk into a same-bit chuck table. For example, the plurality of sets of partial data may originally comprise the data chunk having the same bit, and the storage server 100 (e.g. the control circuit) may store the data chunk having the same bit separately according to an extremely compressed format in the same-bit chuck table, having no need to store the whole of this data chunk. For example, the extremely compressed format may comprise the address information of the data chunk and one or more additional bits for indicating whether each bit of the data chunk is bit 1 or bit 0. According to some embodiments, the storage server 100 (e.g. the control circuit) may perform an operation of storing the data chunk having the same bit separately in the same-bit chuck table in advance, to reduce the complexity of the working flow 200, where the data chunk having the same bit may be removed from the plurality of sets of partial data after the this operation, but the present invention is not limited thereto.

The present invention method and apparatus can perform the data compression efficiently with aid of partial data classification such as the entropy-based classification, and the data compression corresponding to the classification results can greatly reduce the unnecessary time of data compression.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method for performing data-compression management in a storage server, the method being applied to the storage server, the method comprising:
    receiving data from a host device, wherein the data comprises a plurality of sets of partial data;
    performing entropy detection on the plurality of sets of partial data to generate entropy detection values of the plurality of sets of partial data, respectively, wherein an entropy detection value of any set of partial data within the plurality of sets of partial data is related to an average number of bits required for expressing a data unit of multiple data units within said any set of partial data;
    defining a plurality of entropy detection value ranges, each entropy detection value range comprising a plurality of consecutive entropy detection values;
    determining which of the entropy detection value ranges an entropy detection value of any set of partial data falls within in order to classify the plurality of sets of partial data according to the entropy detection values of the plurality of sets of partial data, respectively;
    in response to the classification result, performing data compression on at least one portion of the plurality of sets of partial data through a plurality of data compression modules, respectively, wherein the plurality of data compression modules correspond to different compression capabilities, respectively, data compression is performed on each of the plurality of sets of partial data by a specific data compression module of the plurality of data compression modules according to the classification result, and at least two data compression modules of the plurality of data compression modules are configured to form a plurality of processing pipelines for the data to be processed in for performing data compression, to make a data flow of each of the at least two data compression modules be processed by only said each of the at least two data compression modules, wherein at least two entropy detection values of the entropy detection values are utilized for controlling both of enabling respective data compression of the at least two data compression modules and respectively delivering at least two corresponding sets of partial data having the at least two entropy detection values among the plurality of sets of partial data into the at least two data compression modules; and
    storing the plurality of sets of partial data into at least one storage device of the storage server and recording address mapping information of the plurality of sets of partial data, respectively, wherein said at least one portion of the plurality of sets of partial data is stored as compressed data thereof to save storage space of the storage server.

2. The method of claim 1, wherein the entropy detection value of said any set of partial data is an estimation value indicating a number of bits per data unit for storing a compressed version of said any set of partial data.

3. The method of claim 1, wherein the average number of bits required for expressing the data unit is less than or equal to a predetermined number of bits of each of the data units.

4. The method of claim 1, wherein the entropy detection value of said any set of partial data includes an integer part and a fractional part, and a number of digits forming the fractional part is within a predetermined digit count.

5. The method of claim 1, wherein within said at least one portion of the plurality of sets of partial data, two sets of partial data respectively corresponding to two different classification results are compressed with two of the plurality of data compression modules, respectively.

6. The method of claim 1, wherein said at least one portion of the plurality of sets of partial data comprises a first set of partial data and a second set of partial data; a first classification result of the first set of partial data indicates that a first entropy detection value of the first set of partial data falls within a first entropy detection value range of the plurality of entropy detection value ranges, and a second classification result of the second set of partial data indicates that a second entropy detection value of the second set of partial data falls within a second entropy detection value range of the plurality of entropy detection value ranges; and the method further comprises:
    in response to the first classification result, performing data compression on the first set of partial data through a first data compression module of the plurality of data compression modules, wherein the first entropy detection value range is associated with the first data compression module; and in response to the second classification result, performing data compression on the second set of partial data through a second data compression module of the plurality of data compression modules, wherein the second entropy detection value range is associated with the second data compression module.

7. The method of claim 6, wherein within the plurality of data compression modules, a data compression module corresponding to a first level of compression capability is utilized as the first data compression module, and a data compression module corresponding to a second level of compression capability is utilized as the second data compression module.

8. The method of claim 1, wherein said at least one portion of the plurality of sets of partial data comprises a first set of partial data and a second set of partial data; a first entropy detection value of the first set of partial data is greater than a second entropy detection value of the second set of partial data;

and the method further comprises:
utilizing a first data compression module corresponding to a first level of compression capability and a second data compression module corresponding to a second level of compression capability within the plurality of data compression modules to perform data compression on the first set of partial data and the second set of partial data, respectively.

9. The method of claim 8, wherein the first level of compression capability is lower than the second level of compression capability.

10. The method of claim 1, further comprising:
generating a plurality of hash values of the plurality of sets of partial data, respectively, wherein according to the classification results of the plurality of sets of partial data, a plurality of groups of hash values within the plurality of hash values are stored into a plurality of hash-record tables, respectively; and in response to a comparison result regarding comparison between a hash value of a current set of partial data within the data and a hash value within one of the plurality of groups of hash values, performing de-duplicate processing on the current set of partial data.

11. The method of claim 10, wherein the plurality of groups of hash values correspond to the plurality of entropy detection value ranges, respectively.

12. The method of claim 10, wherein the plurality of sets of partial data comprises a previous set of partial data, and the plurality of hash values comprises a hash value of the previous set of partial data; and the method further comprises:
selecting a hash-record table from the plurality of hash-record tables according to a classification result of the previous set of partial data, and storing the hash value of the previous set of partial data into the hash-record table.

13. The method of claim 10, further comprising:
selecting a hash-record table from the plurality of hash-record tables according to a classification result of the current set of partial data, wherein the hash-record table stores the one of the plurality of groups of hash values.

14. The method of claim 13, wherein the plurality of sets of partial data comprises a previous set of partial data, and the plurality of hash values comprises a hash value of the previous set of partial data, wherein the hash value of the previous set of partial data has been stored into the hash-record table, and the hash value within the one of the plurality of groups of hash values represents the hash value of the previous set of partial data.

15. The method of claim 13, further comprising:
obtaining a hash value of a previous set of partial data from the hash-record table; and comparing the hash value of the current set of partial data with the hash value of the previous set of partial data to generate the comparison result, wherein the comparison result indicates that the hash value of the current set of partial data matches the hash value of the previous set of partial data, and de-duplicate processing is performed on the current set of partial data with respect to the previous set of partial data to save the storage space of the storage server.

16. The method of claim 10, wherein the comparison result indicates that the hash value of the current set of partial data should belong to a same group as the one of the plurality of groups of hash values.

17. The method of claim 10, further comprising:
selecting a hash-record table from the plurality of hash-record tables according to a classification result of said any set of partial data, for storing a hash value of said any set of partial data.

18. An apparatus for performing data-compression management in a storage server, the apparatus comprising:
a control circuit, positioned within the storage server, arranged to control operations of the storage server, wherein the control circuit controls the storage server to receive data from a host device, the data comprises a plurality of sets of partial data, and the control circuit comprises:
an entropy-based classification circuit, arranged to perform entropy-based classification, wherein:
the entropy-based classification circuit performs entropy detection on the plurality of sets of partial data to generate entropy detection values of the plurality of sets of partial data, respectively, wherein an entropy detection value of any set of partial data within the plurality of sets of partial data is related to an average number of bits required for expressing a data unit of multiple data units within said any set of partial data;
the entropy-based classification circuit defines a plurality of entropy detection value ranges, each entropy detection value range comprising a plurality of consecutive entropy detection values; and
the entropy-based classification circuit determines which of the entropy detection value ranges an entropy detection value of any set of partial data falls within in order to classify the plurality of sets of partial data according to the entropy detection values of the plurality of sets of partial data, respectively, and in response to the classification result, performs data compression on at least one portion of the plurality of sets of partial data through a plurality of data compression modules, respectively, wherein the plurality of data compression modules correspond to different compression capabilities, respectively, data compression is performed on each of the plurality of sets of partial data by a specific data compression module of the plurality of data compression modules according to the classification result, and at least two data compression modules of the plurality of data compression modules are configured to form a plurality of processing pipelines for the data to be processed in for performing data compression, to make a data flow of each of the at least two data compression modules be processed by only said each of the at least two data compression modules, wherein at least two entropy detection values of the entropy detection values are utilized for controlling both of enabling respective data compression of the at least two data compression modules and respectively delivering at least two corresponding sets of partial data having the at least two entropy detection values among the plurality of sets of partial data into the at least two data compression modules;

wherein the control circuit is arranged to store the plurality of sets of partial data into at least one storage device of the storage server and record address mapping information of the plurality of sets of partial data, respectively, wherein said at least one portion of the plurality of sets of partial data is stored as compressed data thereof to save storage space of the storage server.

19. The apparatus of claim 18, wherein the control circuit is a processing circuit of the storage server.

20. The apparatus of claim 18, wherein the control circuit is a storage interface circuit coupled between said at least one storage device and a processing circuit of the storage server.

21. The apparatus of claim 20, wherein the control circuit is implemented to be a storage interface card for being installed in the storage server.

* * * * *